(12) United States Patent
Schumacher et al.

(10) Patent No.: US 7,862,797 B2
(45) Date of Patent: Jan. 4, 2011

(54) MIXED OXIDE POWDER COMPRISING ALKALI METAL OXIDE, AND SILICONE RUBBER COMPRISING THIS POWDER

(75) Inventors: Kai Schumacher, Hofheim (DE); Helmut Roth, Mainaschaff (DE); Rainer Golchert, Dieburg (DE); Helmut Mangold, Rodenbach (DE); Mario Scholz, Grundau (DE)

(73) Assignee: EVONIK DEGUSSA GmbH, Essen (DE)

( * ) Notice: Subject to any disclaimer, the term of this patent is extended or adjusted under 35 U.S.C. 154(b) by 230 days.

(21) Appl. No.: 11/917,199

(22) PCT Filed: May 23, 2006

(86) PCT No.: PCT/EP2006/062526

§ 371 (c)(1),
(2), (4) Date: Jan. 23, 2008

(87) PCT Pub. No.: WO2006/134014

PCT Pub. Date: Dec. 21, 2006

(65) Prior Publication Data

US 2008/0199392 A1    Aug. 21, 2008

(30) Foreign Application Priority Data

Jun. 16, 2005  (DE)  ........................ 10 2005 027 720

(51) Int. Cl.
*C01C 1/00*    (2006.01)
(52) U.S. Cl. ................. 423/593.1; 423/335; 423/594.15
(58) Field of Classification Search ................. 423/335, 423/593.1, 594.15
See application file for complete search history.

(56) References Cited

U.S. PATENT DOCUMENTS 4,693,990 A * 9/1987 Hiroyuki et al. ............ 502/116

FOREIGN PATENT DOCUMENTS

DE     196 50 500     6/1998
DE     100 65 028     7/2002

* cited by examiner

*Primary Examiner*—Timothy C Vanoy
*Assistant Examiner*—Richard M Rump
(74) *Attorney, Agent, or Firm*—Oblon, Spivak, McClelland, Maier & Neustadt, L.L.P.

(57) ABSTRACT

Alkali metal oxide-metal oxide mixed oxide powder in the form of aggregates of pore-free primary particles, comprising from 0.005 to 5% by weight of at least one alkali metal oxide, which has a BET surface area of from 100 to 350 $m^2/g$, has a specific DBP number, expressed as DBP number per square meter of specific surface area, greater than or equal to that of a powder which has only the metal oxide component, has the alkali metal oxide distributed in the core and on the surface of the primary particles. Silicone rubber comprising the alkali metal oxide-metal oxide mixed oxide powder.

11 Claims, 1 Drawing Sheet

MIXED OXIDE POWDER COMPRISING ALKALI METAL OXIDE, AND SILICONE RUBBER COMPRISING THIS POWDER

The invention relates to a highly structured metal oxide powder doped with an alkali metal oxide, and to its production and use. The invention further relates to a silicone rubber composition which comprises the highly structured, doped metal oxide powder.

DE-A-10065028 discloses a metal mixed oxide powder having potassium oxide as metal oxide component.

In particular, a potassium oxide-silicon dioxide powder is known.

The powders are produced by feeding an aerosol into the type of flame known for production of fumed oxides in the manner of flame oxidation or flame hydrolysis. The aerosol is obtained from a potassium salt solution and is introduced by means of a carrier gas into a heater, before it is homogeneously mixed with the flame-oxidation gas mixture or flame-hydrolysis gas mixture. The aerosol-gas mixture is then permitted to complete reaction in a flame, and the resultant potassium-oxide-doped powder is isolated from the gas stream. DE-A-10065028 discloses heating of the aerosol to 180° C. Nothing is disclosed about how aerosol and carrier gas are mixed.

The resultant powder, in an electron micrograph, has spherical round primary particles with only very little mutual accretion, and this is seen in the fact that when structure is determined by the DBP method no end point is discernible. Furthermore, the powder has very narrow primary particle diametre distribution, defined as $d_n/d_a$, of at least 0.7, where $d_n$ is the numeric median primary particle diametre and $d_a$ is the median primary particle diametre calculated on the basis of surface area. The pH of the powder, measured on a four percent strength dispersion in water, is from 7.22 to 7.96 in the inventive examples.

The potassium oxide-silicon dioxide powder differs unambiguously from silicon dioxide powders of comparable BET surface area through the low degree of accretion and the narrow primary particle size distribution.

The potassium oxide-silicon dioxide powder is suitable for production of highly filled dispersions of low viscosity.

DE-A-10242798 moreover discloses a metal mixed oxide powder having potassium oxide as component. The result of structural determination on that metal mixed oxide powder by the DBP method is that, given absence of any end point during DBP determination, the powder has a very low level of structuring or else has a level of structuring which, expressed in terms of DBP absorption, is less than 85% of the value which would be given by a metal oxide powder without the potassium oxide component.

As disclosed in DE-A-10242798, a potassium oxide-metal oxide powder can be used for production of silicone rubbers. Potassium oxide-silicon dioxide powder leads to silicone rubbers with very low plasticity, but nevertheless Shore hardness, tensile strength and tear propagation resistance are lower than with silicon dioxide powders without potassium oxide component, given comparable BET surface area. Furthermore, silicone rubbers produced with potassium oxide-silicon dioxide powder have higher transparency than those comprising silicon dioxide powder without potassium oxide component. However, a further improvement in transparency would be desirable for many applications.

It is therefore an object of the invention to provide a metal oxide powder which in particular in silicone rubbers brings about markedly higher transparency than powders which hitherto have been used for this purpose in the prior art, without adverse effect on other mechanical properties.

Another object of the invention is to provide a process for production of the metal oxide powder.

Another object of the invention is to provide a silicone rubber with improved properties.

Figures 1A, 1B:
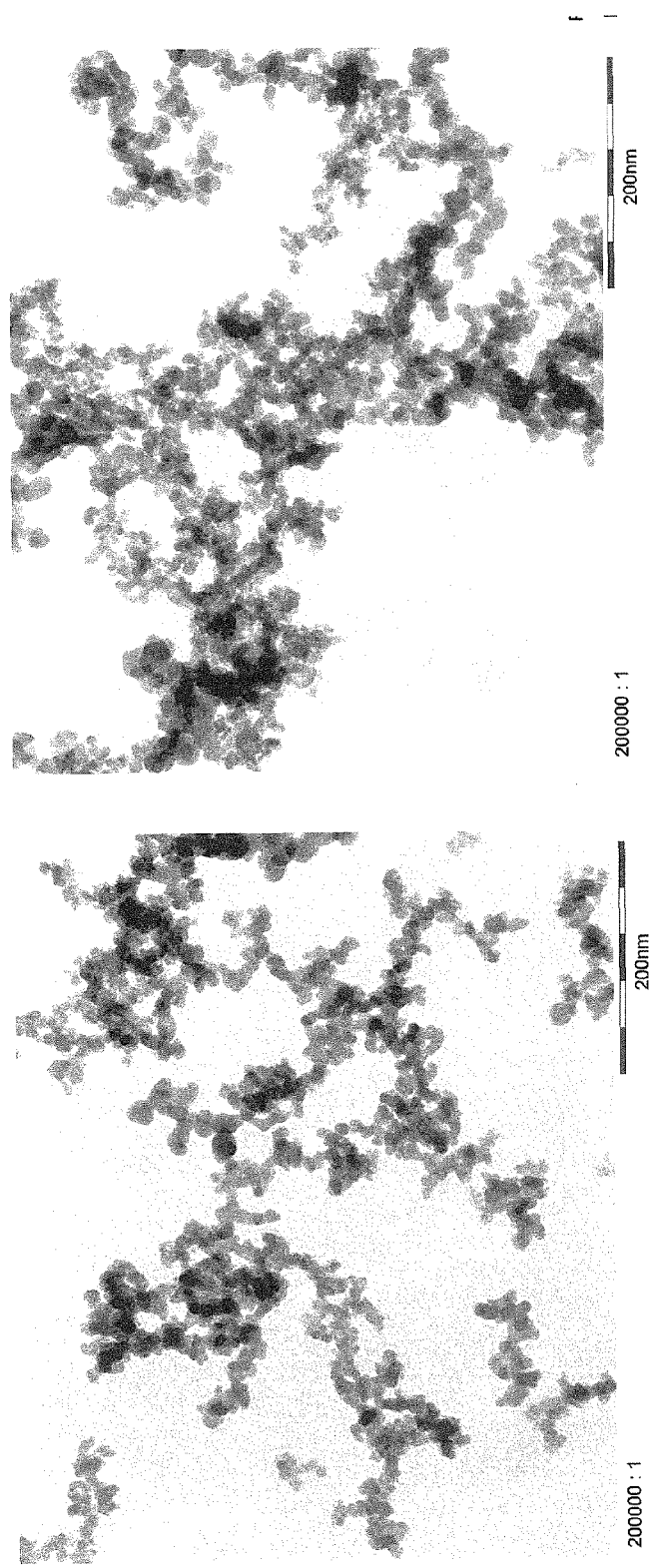
FIG. 1A shows a transmission electron micrograph of an Aerosil® 300 silicon dioxide powder.
FIG. 1B shows a transmission electron micrograph of the inventive powder P-6.

The invention provides an alkali metal oxide-metal oxide mixed oxide powder in the form of aggregates of pore-free primary particles, comprising from 0.005 to 5% by weight of at least one alkali metal oxide, characterized in that it has a BET surface area of from 100 to 350 m²/g, has a specific DBP number, expressed as DBP number per square metre of specific surface area, greater than or equal to that of a powder which has only the metal oxide component, has the alkali metal oxide distributed in the core and on the surface of the primary particles.

Primary particles are very small particles which cannot be comminuted further without breakage of chemical bonds.

These primary particles can undergo accretion to give aggregates. A feature of aggregates is that their surface area is smaller than the total of the surface areas of primary particles of which they are composed. Furthermore, aggregates are not entirely comminuted to give primary particles during dispersion.

A mixed oxide powder is a powder in which there is intimate mixing of alkali metal oxide and metal oxide at the primary particle level or at the aggregate level. The primary particles here have alkali metal-O-metal bonds. There can also be regions of alkali metal oxide present alongside the metal oxide in the primary particles.

The term pore-free means that determination by means of nitrogen cannot detect any pore volumes. The term pore-free does not refer to volumes that sometimes arise between aggregates.

The DBP number (DBP=dibutyl phthalate) is a measure of the degree of accretion of particles. During the DBP absorption process, the force acting on, or the torque (in Nm) of, the rotating blades of the DBP measurement device is determined on addition of defined amounts of DBP, in a manner similar to that for titration. The higher the DBP number, the higher the degree of accretion of the particles. For the inventive mixed oxide powder the result is a pronounced sharp maximum followed by a reduction where a certain amount of DBP is added.

The specific DBP number of the inventive powder can preferably be at least 1.14.

The inventive powder can preferably comprise from 0.05 to 2% by weight of an alkali metal oxide.

The alkali metal mixed oxide component encompasses any of the alkali metal oxides. However, preference is given to potassium or sodium.

The metal oxide component of the inventive powder is subject to no limitation. Silicon dioxide is preferred and for the purposes of the invention is a metal oxide.

The specific surface area of the inventive powder encompasses values from 100 to 350 m²/g. Values of 200±25 m²/g or 300±25 m²/g can be preferred.

The pH of the inventive powder, determined on a four percent strength dispersion in water, can preferably be smaller than 5. The range from 3.5 to 4.5 is particularly preferred.

The invention also provides a process for production of a metal mixed oxide powder, characterized in that an aerosol is produced via spraying of a solution or dispersion of at least one metal salt, this aerosol is carried by means of a carrier gas stream through an externally heated line and thus heated to from 100° C. to 120° C., the carrier gas stream directed in such a way that it initially impacts, laterally with respect to the nozzle, the base of a plate, on which the nozzle has been mounted, and the aerosol is then mixed homogeneously with a gas mixture comprising at least one metal compound and whose metal component differs from the metal component of the aerosol, and with a combustion gas and oxygen, the amount of the aerosol introduced here into the gas mixture being such that the subsequent product comprises from 0.005 to 5% by weight of the metal oxide derived from the aerosol, the aerosol-gas mixture is ignited and allowed to complete reaction in a flame and the resultant powder is isolated from the exhaust gas stream.

There is no limitation of the inventive process to alkali metal oxide-metal oxide mixed oxide powder, but instead it can be used for any mixed metal oxide power.

The metal salt from which the aerosol is obtained can preferably have aluminium, cerium or manganese as metal component. Particular preference is given to alkali metal salts.

The concentration of the metal salt solution serving for production of the aerosol can preferably be from 0.5 to 25% by weight.

Preferred mixed oxide components can be the oxides of silicon, aluminium, titanium, cerium or zirconium.

The invention also provides the use of the inventive powder as filler, as support material, as catalytically active substance, as starting material for preparation of dispersions, as polishing material (CMP applications), as primary ceramic material, in the electronics industry, in the cosmetics industry, for adjustment of the rheology of liquid systems, for heat-protection stabilization, or in the coatings industry.

The invention also provides a silicone rubber which comprises the inventive alkali metal oxide-metal oxide mixed oxide powder. Further constituents that can be present in the silicone rubber are crosslinking agents, fillers, catalysts, colour pigments, release agents, plasticizers and adhesion promoters.

Preference can be given here to a silicone rubber which comprises a potassium oxide-silicon dioxide powder.

The silicone rubber can be an HTV silicone rubber or an LSR silicone rubber, preference being give here to HTV silicone rubber.

HTV silicone rubber is glass-clear, high-viscosity self-levelling silicone polymers whose viscosity is from 15 to 30 k Pas, with chain length of about 10 000 SiO units. Liquid silicone rubber (LSR) has practically the same molecular structure as HTV rubber, but its average molecular chain length is lower by a factor of 6 and its viscosity is therefore lower by a factor of 1000 (20-40 Pas).

Silicone rubber is used in many branches of industry. HTV silicone rubbers are used as gaskets, hoses, profiles, textile coatings, O-rings, pacifiers or keyboards, not only in vehicle and aircraft construction but also in the supply of energy or appliance construction, or in the form of sports equipment.

EXAMPLES

BET surface area is determined to DIN 66131.

Loss on drying is determined for 2 h and 105° C., by a method based on DIN/ISO 787/II, ASTM D 280, JIS K 5101/21.

Dibutyl phthalate absorption is measured by RHEOCORD 90 equipment from Haake, Karlsruhe, Germany. For this, 16 g of the silicon dioxide powder are charged to 0.001 g accuracy to a kneading chamber, and this is sealed with a cap, and dibutyl phthalate is metreed in by way of a hole in the cap at a prescribed feed rate of 0.0667 ml/s. The kneader is operated with a motor rotation rate of 125 revolutions per minute. Once the torque maximum has been achieved, the kneader and the DBP feed are automatically switched off. DBP absorption is calculated as follows from the amount of DBP consumed and the starting weight of the particles:

$$\text{DBP number (g/100 g)} = (\text{consumption of DBP in g/starting weight of particles in g}) \times 100.$$

Example P-1 (comparative example) is carried out as described in DE 19650500. 4.44 kg/h of $SiCl_4$ are vaporized here and transferred to the central tube of the burner. 2.5 $Nm^3/h$ of hydrogen and 7 $Nm^3/h$ of air are also fed into this tube. This gas mixture flows out of the inner burner nozzle and burns in the burner space of a water-cooled flame tube. 0.3 $Nm^3/h$ of secondary hydrogen and 0.2 $Nm^3/h$ of nitrogen are also fed into the outer nozzle surrounding the central nozzle, in order to prevent formation of caked deposits. 45 $Nm^3/h$ of air are also drawn from the environment into the flame tube, which is at slightly subatmospheric pressure.

The aerosol is produced from a 2.48 percent strength aqueous potassium chloride solution by means of ultrasound nebulization, the nebulizing rate used being 204 g/h of aerosol. By means of a stream 3.5 $Nm^3/h$ of carrier gas (air) passed into the gas space of the container for the potassium chloride solution, the aerosol is carried out of the container and, being passed through externally heated lines, heated to 160° C. The aerosol is then discharged from the inner nozzle and is homogeneously mixed with the gas mixture composed of silicon tetrachloride, hydrogen and oxygen. After flame hydrolysis, the reaction gases and the resultant powder are drawn through a cooling system via application of subatmospheric pressure, whereupon the particle-gas stream is cooled to from about 100 to 160° C. The solid is isolated from the exhaust gas stream in a filter or cyclone. In a further step, any remaining adherent hydrochloric acid residues are removed from the silicon dioxide powder via treatment with air comprising water vapour at temperatures of from 400 to 700° C. The powder thus obtained is white fine-particle powder P-1.

Example P-2 (comparative example) is carried out as Example 1. Table 1 gives the modified amounts of starting materials and settings.

Example P-3 (inventive): 85 kg/h of $SiCl_4$ are vaporized and transferred to the central tube of the burner described in DE-A-196 50500. 40 $Nm^3/h$ of hydrogen and 124 $Nm^3/h$ of air are also fed into this tube. This gas mixture flows out of the inner burner nozzle and burns in the burner space of a water-cooled flame tube. 4 $Nm^3/h$ of secondary hydrogen are also fed into the outer nozzle surrounding the central nozzle, in order to prevent formation of caked deposits.

The aerosol is produced from a 5 percent strength aqueous potassium chloride solution by means of a twin-fluid nozzle, mounted at the base of the container. 1100 g/h of aerosol are generated here. By means of a stream 18 Nm³/h of carrier gas (air), directed in such a way that it first impacts, laterally with respect to the twin-fluid nozzle, the base of a plate on which the twin-fluid nozzle has been mounted, the aerosol is carried through an externally heated line and thus heated to 120° C. The aerosol/support gas mixture is then discharged from the inner nozzle and it is homogeneously mixed with the gas mixture composed of silicon tetrachloride, hydrogen and oxygen. After flame hydrolysis, the reaction gases and the resultant powder are drawn through a cooling system via application of subatmospheric pressure, and the particle-gas stream is thus cooled to from about 100 to 160° C. The solid is isolated from the exhaust gas stream in a filter or cyclone. In a further step, any remaining adherent hydrochloric acid residues are removed from the silicon dioxide powder via treatment with air comprising water vapour at temperatures of from 400 to 700° C. The powder thus obtained is a white fine-particle powder.

The inventive Examples P-4 to P-8 are carried out as Example P-3. Table 1 gives the modified amounts of starting materials and settings.

Table 1 also gives the analytical data for the powders of Examples 1 to 8.

HTV Silicone Rubbers

Compounded materials are produced on a two-roll mill with 40 parts of the powders P1-P5 and with 6 parts of Si 200 silicone oil (GE Bayer Silicones) as processing aid. The mixtures are crosslinked with DCLBP peroxide after 7 days.

Example SK-1: 400 g of silicone polymer are charged to a two-roll mill. As soon as a homogeneous milled sheet has formed on the slave roll (faster-rolling roll), 160 g of powder P-1 are added. The powder is added slowly and in portions between the two rolls. After addition of about 50% of the powder, 24 g of the processing aid are incorporated. The scrapper is then used to remove the compounded material from the roll and turn it. The remaining 50% of the powder are then added.

Rolling is continued for a further 5 min after incorporation, for dispersion and homogenization of the powder. The mixture is turned a further 5 times here. The resultant mixtures are stored for 1 week.

After storage, the compounded material is mixed on the roll mill for plastification until a homogeneous milled sheet is produced. 2.8 g of DCLBP peroxide are then added. Rolling is continued for a further 8 min for dispersion and homogenization of the peroxide, and the scrapper is used here to remove the mixture from the roll and turn it 8 times. Storage for 24 hours at room temperature takes place once again (advantageously in PE foil).

Prior to vulcanization, the compounded material is again plastified on the two-roll mill. The heating press is preheated to 140° C. Four 2 mm silicone sheets (press time 7 min, 4*50 g of compounded material) and 1 6 mm silicone sheet (press time 10 min, 120 g of compounded material) are vulcanized between the chromed steel plates.

To remove peroxide cleavage products, the sheets are subjected to post-vulcanization treatment for 6 hours at 200° C. in a hot-air oven. Test specimens are cut from the vulcanizates and are stored under standard conditions of temperature and humidity.

Silicone rubbers SR-2, SR-3, SR-4 and SR-5 are obtained correspondingly from powders P2, P3, P4 and P5.

Table 2 gives the mechanical properties of the silicone rubbers. The intended comparisons are SR1 with SR-3 and, respectively, SR-3 and SR-4 with SR-2.

A particularly advantageous feature is the markedly higher Shore A hardness of the products SR-3, SR-4, SR-5 in comparison with the comparative specimens. With the optical properties, transparency is to be given particular emphasis. SR-3, SR-4 and SR-5 exhibit markedly higher transparency than the comparative specimens.

The significant differences and advantages of the present invention in comparison with the prior art are:

The inventive powder differs from powders of the prior art especially markedly in the higher degree of accretion of the aggregates. This is shown by way of example by the transmission electron micrographs of an Aerosil® 300 silicon dioxide powder (FIG. 1A), Degussa and of the inventive powder P-6 (FIG. 1B). Furthermore, the pH value of the inventive powders is lower than pH in the alkali metal mixed oxide powders of the prior art.

Furthermore, the primary particle diametre distribution of the inventive powder, defined as $d_n/d_a$, is less than 0.7, where $d_n$ is the numeric median primary particle diametre and $d_a$ is the median primary particle diametre calculated on the basis of surface area. The prior art discloses only potassium-oxide-doped $SiO_2$ particles whose $d_n/d_a$ ratio is at least 0.7.

The examples also show that the nature of the aerosol production process and the aerosol temperature are significant for obtaining the inventive powder.

Furthermore, the silicone rubbers obtained with the inventive powders show markedly higher transparency than those obtained with metal mixed oxide powders of the prior art with identical production conditions.

TABLE 1

Starting materials, amounts of starting materials and analytical values

| | | Comparison | | Inventive | | | | | |
|---|---|---|---|---|---|---|---|---|---|
| | | P-1 | P-2 | P-3 | P-4 | P-5 | P-6 | P-7 | P-8 |
| $SiCl_4$ | kg/h | 4.44 | 4.44 | 85 | 85 | 85 | 85 | 85 | 85 |
| Primary air | Nm³/h | 7.0 | 6.7 | 124 | 139 | 135 | 140 | 76 | 132 |
| Primary $H_2$ | Nm³/h | 2.5 | 2.0 | 40 | 40 | 40 | 40 | 43 | 40 |
| Lambda, core | | 1.17 | 1.40 | 1.3 | 1.45 | 1.41 | 1.46 | 1.41 | 1.38 |
| Gamma, core | | 2.13 | 1.71 | 1.78 | 1.78 | 1.78 | 1.78 | 1.92 | 1.78 |
| Secondary $H_2$ | Nm³/h | 0.3 | 0.3 | 4 | 4 | 4 | 4 | 4 | 4 |
| Metal salt solution | | KCl | KCl | KCl | KCl | KCl | KCl | $AlCl_3$ | NaCl |
| Concentration | g/l | 2.48 | 2.48 | 5 | 2.5 | 1 | 5 | 1.5 | 5 |
| Amount | g/h | 204 | 246 | 1100 | 1050 | 1030 | 1100 | 10.35 | 968 |
| Support gas (air) | Nm³/h | 3.5 | 3.5 | 18 | 18 | 18 | 18 | 18 | 18 |
| Aerosol temperature | ° C. | 160 | 160 | 120 | 112 | 118 | 115 | 116 | 125 |
| Mixed oxide component | % by | $K_2O$ | $K_2O$ | $K_2O$ | $K_2O$ | $K_2O$ | $K_2O$ | $Al_2O_3$ | $Na_2O$ |

TABLE 1-continued

Starting materials, amounts of starting materials and analytical values

|  |  | Comparison | | Inventive | | | | | |
|---|---|---|---|---|---|---|---|---|---|
|  |  | P-1 | P-2 | P-3 | P-4 | P-5 | P-6 | P-7 | P-8 |
| Content | wt. | 0.15 | 0.18 | 0.12 | 0.06 | 0.02 | 0.11 | 0.17 | 0.09 |
| BET surface area | $m^2/g$ | 208 | 324 | 216 | 317 | 308 | 317 | 130 | 293 |
| DBP number | g/100 g | 234 | 305 | 326 | 362 | 370 | 372 | 155 | 380 |
| DBP number/BET | $g/m^2$ | 1.125 | 0.94 | 1.5 | 1.14 | 1.2 | 1.17 | 1.19 | 1.3 |
| $d_n/d_a$*) |  | >0.7 | >0.7 | 0.69 | 0.63 | 0.69 | 0.63 | — | 0.55 |
| pH of 4% dispersion |  | 6.66 | 6.35 | 4.1 | 4.4 | 4.2 | 4.5 | 4.4 | 4.6 |

*)$d_n$ arithmetic particle diametre, $d_a$ median particle diametre

TABLE 2

Mechanical and optical properties of HTV silicone rubbers

|  |  | Comparison | | Inventive | | |
|---|---|---|---|---|---|---|
| Example |  | SR-1 | SR-2 | SR-3 | SR-4 | SR-5 |
| Tensile strength | $N/mm^2$ | 7.4 | 8.6 | 7.9 | 8.2 | 9.1 |
| Tensile strain at break | % | 370 | 445 | 390 | 560 | 530 |
| Hardness | Shore A | 52 | 60 | 65 | 67 | 71 |
| Rebound resilience | % | 47 | 48 | 57 | 53 | 57 |
| Williams plasticity |  | 457/191 | 820/233 | 683/208 | 887/320 | 814/707 |
| Transparency | DE/D65*) | 20 | 23 | 34 | 39 | 42 |

*)Transparency defined as colour difference DE with D65 illuminant. A larger number here means higher transparency.

The invention claimed is:

1. A mixed oxide powder comprising: from 0.005 to 5% by weight of at least one alkali metal oxide and at least one metal oxide, wherein the powder
   is in the form of aggregates of pore-free primary particles,
   has a BET surface area of from 100 to 350 $m^2/g$,
   has a specific DBP number, expressed as DBP number per square meter of specific surface area, greater than or equal to that of a powder which has only the metal oxide component, and
   has the alkali metal oxide distributed in the core and on the surface of the primary particles.

2. The mixed oxide powder according to claim 1, wherein the DBP number per square metre of specific surface area is greater than 1.14.

3. The mixed oxide powder according to claim 1, wherein potassium or sodium are the alkali metal of the alkali metal oxide.

4. The mixed oxide powder according to claim 1, characterized in that wherein silicon dioxide is the metal oxide.

5. The mixed oxide powder according to claim 1, wherein the powder has a specific surface area of 200±25 $m^2/g$ or 300±25 $m^2/g$.

6. The mixed oxide powder according to claim 1, wherein a 4% dispersion of the powder in water has a pH of less than 5.

7. The mixed oxide powder according to claim 1, wherein the content of alkali metal oxide is from 0.05 to 0.3% by weight.

8. A process for production of the mixed metal oxide powder of claim 1, comprising:
   producing an aerosol via spraying of a solution or dispersion of at least one metal salt;
   carrying the aerosol by means of a carrier gas stream through an externally heated line and thus heated to from 100° C. to 120° C., the carrier gas stream directed in such a way that it initially impacts, laterally with respect to the nozzle, the base of a plate, on which the nozzle has been mounted;
   mixing homogeneously the aerosol with a gas mixture comprising at least one metal compound and whose metal component differs from the metal component of the aerosol, and with a combustion gas and oxygen, the amount of the aerosol introduced here into the gas mixture being such that the subsequent product comprises from 0.005 to 5% by weight of the metal oxide derived from the aerosol; and
   igniting the aerosol-gas mixture and allowing the mixture to complete reaction in a flame and isolating the resultant powder from the exhaust gas stream.

9. The process according to claim 8, wherein the metal salt is an alkali metal salt.

10. The process according to claim 9, wherein the concentration of the metal salt solution is from 0.5 to 25% by weight.

11. A silicone rubber, comprising the mixed oxide powder according to claim 1.

* * * * *